Dec. 4, 1962

C. J. HEROLD 3,066,533

TEMPERATURE EQUALIZING MULTIPORT WATER LEVEL GAUGE

Filed Dec. 23, 1960

INVENTOR
Conrad J. Herold

BY

ATTORNEY

United States Patent Office 3,066,533
Patented Dec. 4, 1962

3,066,533
TEMPERATURE EQUALIZING MULTIPORT
WATER LEVEL GAUGE
Conrad J. Herold, Windsor, Conn., assignor to Combustion Engineering, Inc., Windsor, Conn., a corporation of Delaware
Filed Dec. 23, 1960, Ser. No. 77,898
5 Claims. (Cl. 73—328)

This invention relates to water level indicating gauges, and is particularly adapted for use with steam and water drums in a modern boiler.

In a modern steam generating unit the upper steam and water drums are often subjected to pressures upwards of 2500 p.s.i., with temperatures of 500° to 600° F. If a conventional water gauge were used with such a steam and water drum, a very inaccurate or untrue reading of the actual water level in the drum would be seen by observing the gauge. With temperatures of 500° to 600° F., the water standing in the gauge quickly loses its heat to the surrounding atmosphere. As the temperature of such water decreases, the density increases, and this is particularly true when operating under pressures close to the critical pressure, which is approximately 3200 p.s.i. At these pressures, a drop of a few hundred degrees in temperature of the water in the gauge will change the level of the water in the gauge several inches from the actual level of water in the drum which it is supposed to be a reading of. Also, the steam in the connection between the upper portion of the steam and water drum and the upper portion of the water gauge may condense and this condensate being added to the water in the gauge also leads to inaccurate readings.

To overcome the above inaccuracies, an object of the present invention is to make a water level gauge whereby the water in the gauge is maintained at the same temperature as the fluids in the drum, which will provide accurate and true readings.

A further object is to make such a water gauge that will be compact, reliable and economical to manufacture, install and operate.

Other objects and advantages will become more apparent as reference is had to the accompanying drawing wherein.

Figure 1:
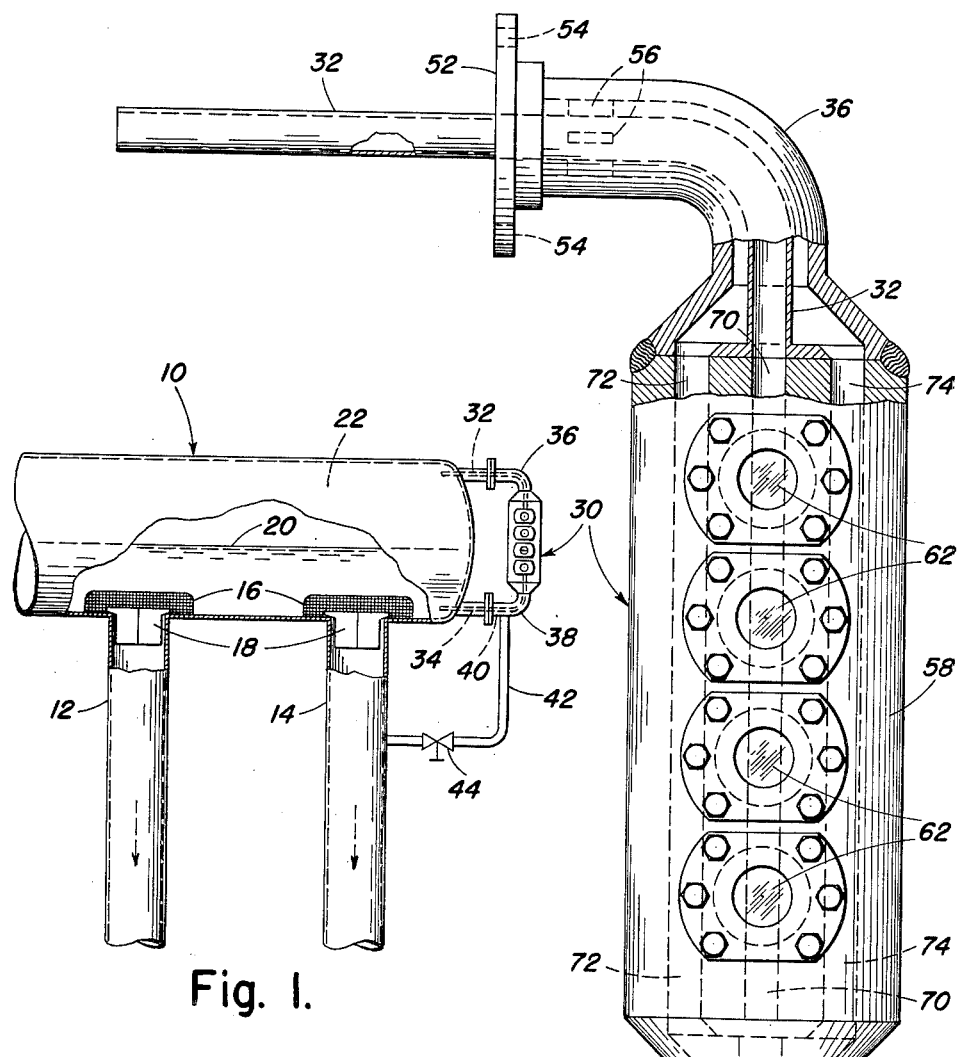
FIGURE 1 is a side view of a steam and water drum containing the novel water gauge.

In FIGURE 1, 10 designates a pressure vessel, in the illustrated embodiment it being a steam and water drum to be used in a modern steam generating unit containing a controlled, or forced circulation system. Downcomers or outlets 12 and 14 lead from the drum 10. These downcomers contain pumps, not shown, by means of which the water is forced through tubes lining the walls of a furnace, where the water in the tubes absorb heat from the gases in the furnace. A mixture of steam and water then continues on, and enters the steam and water drum 10, where the steam is separated and flows from the drum to a point where it is utilized in any suitable manner, such as in driving a turbine to generate electricity.

Downcomers 12 and 14 contain suitable filtering screens 16 and guide vanes 18. The water level in the drum is indicated by 20, and above this water level is steam 22.

A water level indicated gauge 30 is illustrated in FIGURE 1 as being connected to drum 10 by means of upper and lower legs or pipes 32 and 34, in a conventional manner. Outer pipes 36 and 38 surround, and are concentric with, inner pipes 32 and 34 respectively, and are for the purpose of heating the inner pipes, thus keeping the temperature therein the same as that in drum 10. Lower pipe 38 contains a solid annular plug 40 which completely seals the passage 38 from the drum 10. Pipe 42 joins pipe 38 with downcomer 14, and the high rate of flow of water through the downcomer from drum 10 causes an aspiration effect at the point of connection between pipe 42 and downcomer 14, thus maintaining a continuous flow of steam for heating purposes, through upper pipe 36, water guage 30, lower pipe 38 and pipe 42. Since in a controlled circulation system, where pumps are utilized to maintain flow through the downcomers, a high rate of flow therethrough is established, and it may be desirable to throttle, or regulate the amount of flow through the heating circuit containing pipes 36, 38, and 42. For this purpose throttling valve 44 is inserted in line 42 by means of which the flow can be regulated.

Figure 2:
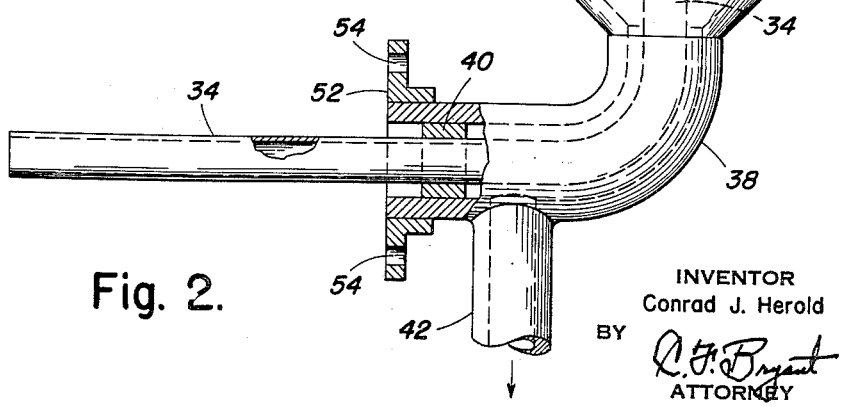
FIGURE 2 is an enlarged side view of the water gauge shown in FIGURE 1.

Referring now to FIGURE 2, the specific construction of the gauge 30 is better shown. The main portion of the gauge is made out of a block or solid piece 58 of any suitable metal, with three passages 70, 72, and 74 drilled therethrough. Removable bull's-eye units 62, containing glass covered openings for visual observance of the liquid level of the gauge, are secured in suitable openings in block 58. Upper and lower flanges 52, containing holes 54, enable the gauge 30 to be securely fastened to a wall of the drum 10.

Central passage 70 connects at its upper and lower ends to inner pipes 32 and 34, thus forming a closed circuit between the upper and lower portions of drum 10. Passages 72 and 74 open into the upper and lower outer pipes 36 and 38, which pipes have flared ends so that they can be attached to block 58. Solid annular member 40 prevents flow between drum 10 and pipe 38, thus forcing all of the steam from pipe 38 to flow down through pipe 42. Annular spider or web 56 is for the purpose of positioning and supporting pipe 36 with respect to pipe 32, and does not restrict the flow between the drum 10 and outer pipe 36. It is to be understood that the horizontal portion of pipes 32, 34, 36, and 38 can be any length, depending on the distance from the drum that it is desired to place the gauge. Also, although the pressure within the drum 10 is very high, upwards of 2500 p.s.i., the inner pipes 32 and 34 can be made with fairly thin walls, since the pressure outside is equal to the pressure inside. The outer pipes, 36 and 38, being subject to very high pressure within, and atmospheric pressure on the outside, of course will have to be made to withstand high pressure.

The operation of the device is as follows: Steam is allowed to continuously flow through pipe 36, passages 72 and 74, pipe 38, and pipe 42, to thereby prevent loss of heat in pipes 32, 34, and passage 70. Passages 72 and 74 pass through block 58 in heat exchange relationship with passage 70. The high rate of flow of water through downcomer 14 maintains the flow of steam through the heating circuit, and this flow can be adjusted by means of the throttling valve 44.

It is only necessary to tap two holes into drum 10 for connection of the water gauge just as in the case of a conventional gauge; since the inner and outer connecting pipes are concentric. Also, the inner pipes 32 and 34 can be thin walled, since there is no pressure differential thereacross. No added expense is involved in the heating circuit for a source of heating medium, since the steam contained in the drum 10 is used, and the amount of steam used for this purpose is so small in comparison with the total amount of steam generated so as to be negligible. The above features make the water gauge of this invention of very little higher cost to construct, install, and operate, than that of a conventional water gauge with no heating circuit.

The upper outer concentric heating pipe surrounds the inner pipe throughout its entire length, thus preventing any condensation from taking place. The lower inner pipe is surrounded throughout a substantial portion of its length, thus keeping the water heated to the temperature existing in the drum. The passages 72 and 74 being in heat exchange relationship with the passage 70 will keep the steam and water in such passage at the desired temperature. In view of the above, it can be seen that a very true and accurate reading of the water level in the drum is obtained by observing the gauge, regardless of the pressure and temperature existing in the drum.

While the preferred embodiment of the invention has been shown and described, it will be understood that such is merely illustrative and not meant to be restrictive in any sense.

What I claim is:

1. In combination, a pressure vessel containing a liquid in the lower portion and a vapor in the upper portion thereof, an outlet leading from said pressure vessel, a liquid level gauge, a first pipe joining the upper portion of the pressure vessel to the upper portion of the gauge, a second pipe joining the lower portion of the pressure vessel to the lower portion of the gauge, a first passage through the gauge connected to said first and second pipes, a second passage through said gauge in heat exchange relationship to said first passage, a third pipe joining the upper portion of the pressure vessel with said second passage, said third pipe surrounding said first pipe, and a fourth pipe joining said second passage to the outlet of said pressure vessel, the flow of fluid from said pressure vessel through said outlet maintaining flow of vapor through said third pipe, second passage, and fourth pipe.

2. The combination set forth in claim 1, said fourth pipe containing a valve.

3. In combination, a drum containing steam and water under high pressure, an outlet from the drum through which water is allowed to flow from the drum, a water level gauge, a first pipe connecting the upper portion of the drum to the upper portion of the gauge, a second pipe joining the lower portion of the drum to the lower portion of the gauge, a first passage through said gauge connected to said first and second pipes, means allowing the water level in said first passage to be observed, a second passage through said gauge in heat exchange relationship to said first passage, a third pipe connecting the upper portion of the drum with said second passage, said third pipe surrounding said first pipe throughout its entire length, and a fourth pipe connecting said second passage to the outlet of said drum, whereby flow of water through said outlet maintains flow of steam through said third pipe, second passage, and fourth pipe.

4. The combination set forth in claim 3, said fourth pipe being concentric with and surrounding said second pipe throughout a substantial portion of its length.

5. The combination set forth in claim 4, said fourth pipe containing a throttling valve.

References Cited in the file of this patent

UNITED STATES PATENTS

| | | |
|---|---|---|
| 2,337,171 | Winton | Dec. 21, 1943 |
| 2,993,376 | Kinderman | July 25, 1961 |

FOREIGN PATENTS

| | | |
|---|---|---|
| 13,123 | Great Britain | 1896 |
| 132,669 | Great Britain | Sept. 25, 1919 |
| 837,343 | Great Britain | June 9, 1960 |